(12) United States Patent
Williams et al.

(10) Patent No.: US 9,089,155 B2
(45) Date of Patent: Jul. 28, 2015

(54) CHIPS AND MANUFACTURE THEREOF

(71) Applicant: Frito-Lay Trading Company GmbH, Bern (CH)

(72) Inventors: James Steven Edward Williams, Leicester (GB); Kathryn Elizabeth Davies, Leicester (GB)

(73) Assignee: FRITO-LAY TRADING COMPANY GMBH, Bern (CH)

( * ) Notice: Subject to any disclaimer, the term of this patent is extended or adjusted under 35 U.S.C. 154(b) by 0 days.

(21) Appl. No.: 14/401,407

(22) PCT Filed: May 15, 2013

(86) PCT No.: PCT/EP2013/060045
§ 371 (c)(1),
(2) Date: Nov. 14, 2014

(87) PCT Pub. No.: WO2013/171264
PCT Pub. Date: Nov. 21, 2013

(65) Prior Publication Data
US 2015/0150290 A1  Jun. 4, 2015

(30) Foreign Application Priority Data
May 16, 2012  (GB) .................................. 1208632.8

(51) Int. Cl.
A23C 1/00  (2006.01)
A23L 1/217  (2006.01)
(Continued)

(52) U.S. Cl.
CPC .............. *A23L 1/217* (2013.01); *A23L 1/0023* (2013.01); *A23L 1/2165* (2013.01); *A23L 1/2175* (2013.01); *A23V 2002/00* (2013.01)

(58) Field of Classification Search
CPC .............................. A23L 1/217; A23L 1/0023
See application file for complete search history.

(56) References Cited

U.S. PATENT DOCUMENTS

| 4,756,916 A | 7/1988 | Dreher et al. |
| 5,182,127 A | 1/1993 | Schwab et al. |

(Continued)

FOREIGN PATENT DOCUMENTS

| EP | 1025764 A1 | 8/2000 |
| GB | 2165437 A | 4/1986 |

(Continued)

OTHER PUBLICATIONS

Van der Sman: Structuring of indirectly expanded snacks based on potato ingredients: A review; Journal of Food Engineering 114 (2013) 413-425; Available online Sep. 17, 2012.*

(Continued)

*Primary Examiner* — Patricia George
(74) *Attorney, Agent, or Firm* — Colin P. Cahoon; Shaukat A. Karjeker; Carstens & Cahoon, LLP

(57) ABSTRACT

A method of manufacturing a snack chip, the method comprising the steps of:
i. providing a plurality of pellets including at least one potato ingredient;
ii. compressing the pellets in a closed mould;
iii. baking the compressed pellets in the closed mould at an elevated baking temperature to form a snack chip having a moisture content of from 4 to 10 weight % based on the weight of the snack chip;
iv. ejecting the snack chip from the mould; and
v. drying the snack chip to a final snack chip moisture content of from 0.5 to less than 4 weight % based on the weight of the snack chip.

19 Claims, 1 Drawing Sheet

(51) Int. Cl.
  *A23L 1/00*     (2006.01)
  *A23L 1/2165*   (2006.01)

(56) References Cited

U.S. PATENT DOCUMENTS

| 6,004,612 | A | 12/1999 | Andreski et al. | |
|---|---|---|---|---|
| 6,432,463 | B1 | 8/2002 | Bhaskar et al. | |
| 2004/0035859 | A1* | 2/2004 | Childress et al. | 219/679 |
| 2005/0150392 | A1* | 7/2005 | Van Poucke | 99/323.4 |
| 2005/0196495 | A1 | 9/2005 | Sakaguchi | |
| 2008/0241332 | A1* | 10/2008 | Anand et al. | 426/560 |
| 2009/0280224 | A1* | 11/2009 | Anand et al. | 426/242 |
| 2011/0076381 | A1 | 3/2011 | Anand et al. | |

FOREIGN PATENT DOCUMENTS

| JP | 2010187644 A | 9/2010 |
|---|---|---|
| WO | 2008118585 A2 | 10/2008 |
| WO | 2009137171 A2 | 11/2009 |

OTHER PUBLICATIONS

PCT Search Report and Written Opinion for PCT/EP2013/060045 mailed Aug. 7, 2013 (9 pages).

UKIPO Combined Search and Examination Report for application GB1208632.8 mailed Aug. 9, 2012 (8 pages).

* cited by examiner

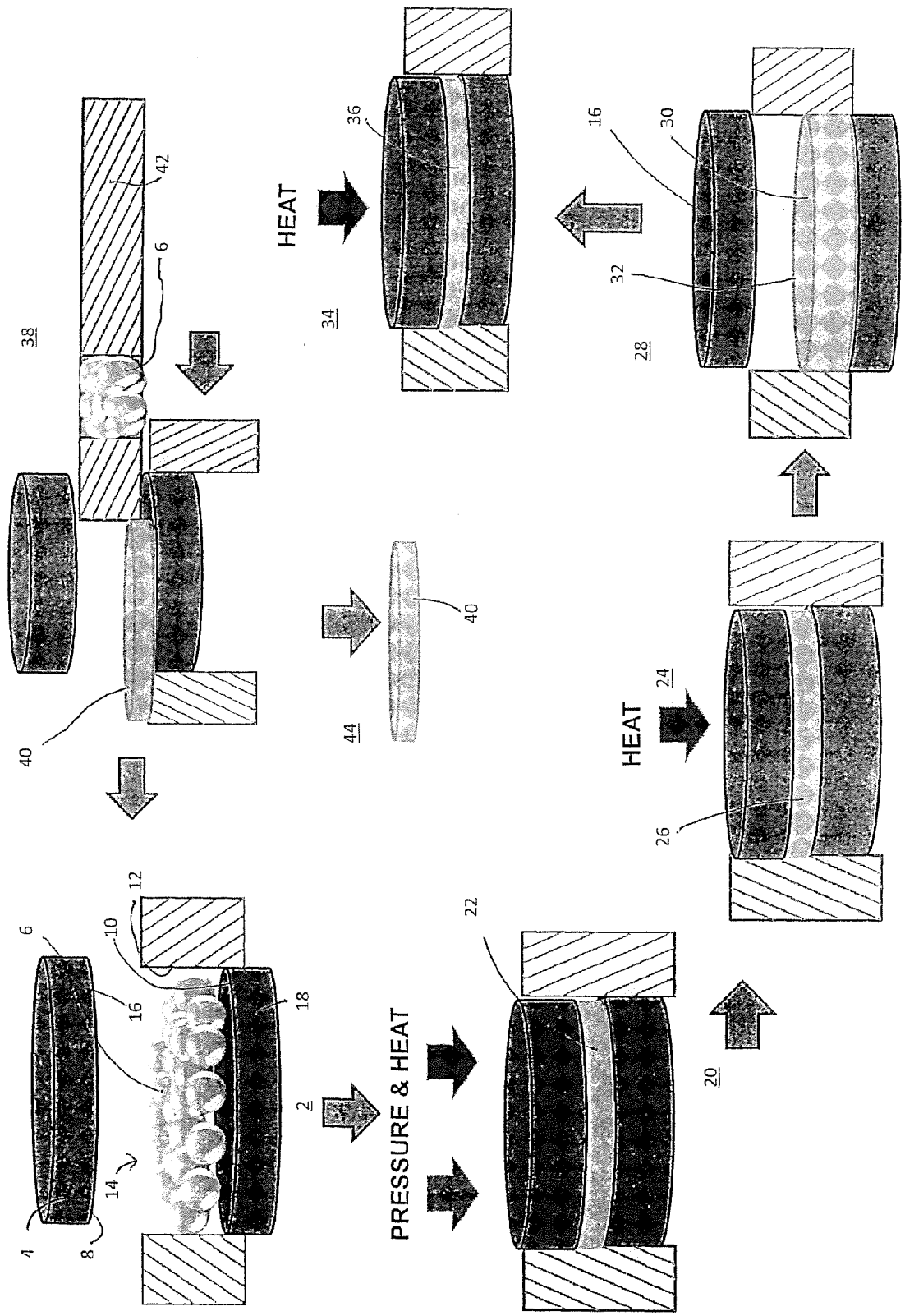

CHIPS AND MANUFACTURE THEREOF

CROSS-REFERENCE TO RELATED APPLICATIONS

This application is a US 371 National Stage Application from PCT Application No. PCT/EP2013/060045 filed May 15, 2013, which claims priority to GB Application No. 1208632.8 filed May 16, 2012, the technical disclosures of which are hereby incorporated by reference in their entirety.

BACKGROUND OF THE INVENTION

1. Technical Field

The present invention relates to a method of manufacturing snack chips, in particular snack chips comprising potato.

2. Description of Related Art

A number of potato-based snack chips are commercially available. These snack chips are manufactured by a process in which a potato-containing food material, typically in the form of extruded pellets, is subjected to high temperature and pressure in a mould to form a compressed cooked chip. Although some of these products exhibit acceptable taste and texture for the consumer, they tend to have a high acrylamide content, for example more than 2000 ppb. Acrylamide is believed to be a potential carcinogen. It has been known since 2002 that acrylamide may be present in some cooked foods, such as potato products. There is a generally recognized need in the snack food industry to minimize the acrylamide content in snack foods.

SUMMARY OF THE INVENTION

Currently therefore, there exists a need in the art for a method of manufacturing a snack chip using a pellet pressing technique which produces a crispy and crunchy snack chip having a significant potato content yet has a very low acrylamide content.

It is accordingly an aim of this invention to provide a method of manufacturing a snack chip using a pellet pressing technique which produces a crispy and crunchy snack chip having a significant potato content yet has a very low acrylamide content.

The present invention provides a method of manufacturing a snack chip, the method comprising the steps of:
  i. providing a plurality of pellets including at least one potato ingredient, wherein the pellet includes at least 25 wt %, based on the weight of the pellet, of the at least one potato ingredient and wherein the at least one potato ingredient is selected from one or more of a dehydrated potato ingredient, a non-dehydrated potato ingredient or a whole potato ingredient, the pellets being formed by extruding a dough including the at least one potato ingredient at a temperature of not greater than 120° C.;
  ii. compressing the plurality of pellets in a closed mould in a first pressing step, to form a compressed body;
  iii. baking the compressed body in the closed mould at a baking temperature of from 180 to 240° C. to form a baked compressed body;
  iv. at least partially opening the mould to allow the baked compressed body to expand to form an expanded body; and
  v. in a second subsequent pressing step, compressing the expanded body at the elevated baking temperature in the closed mould to form a snack chip having a moisture content of from 4 to 10 weight % based on the weight of the snack chip;
  vi. opening the mould, wherein at least a portion of the snack chip expands in thickness to form the final snack chip and releasing steam within the snack chip to cause at least one of blistering and bending of at least one portion of the snack chip;
  vii. ejecting the snack chip from the mould; and
  viii. drying the snack chip to a final snack chip moisture content of from 0.5 to less than 4 weight % based on the weight of the snack chip, wherein the drying step viii is carried out at a temperature of not greater than 121° C.

Preferred features are defined in the dependent claims.

Compared to known approaches to produce pressed potato-containing snack chips, the present invention can provide the combination of (a) high crispy and crunchy texture and (b) high potato content, which contributes to providing enhanced flavour and colour in the final baked snack chip, together with (c) low levels of acrylamide in the snack chips.

The present invention is at least partly predicated on the finding by the present inventors that by carrying out the pressing process so that the final moisture content of the snack chip on exiting the high temperature pressing mould is relatively high, at least 4 wt % moisture content, preferably at least 6 wt % moisture content, levels of acrylamide in the final snack chip after low temperature drying are significantly reduced.

The inventors have found that by providing time and temperature parameters for the double pressing, expanding and baking steps, the moisture content of the snack chip can be controlled without a deleterious effect on the desired crispness and crunchiness of the resultant snack chip. The higher moisture content in turn provides that the high temperature processes do not significantly increase the acrylamide content of the product during the double pressing, expanding and baking steps, the acrylamide content being typically maintained at a level of less than 500 ppb by weight.

Still further, the high moisture content on exiting the pressing mould means that a high steam content is present in the snack chip. This steam is rapidly released from the snack chip as the mould pressure is released, causing extensive blistering and substantially random bending of the snack chip to provide an undulating three dimensional structure. The blisters and bent configuration are retained in the final snack chip structure after drying, which forms a hardened structure exhibiting a crispy and crunchy texture when consumed by the consumer. The resultant shape and configuration of the snack chip is particularly attractive to the consumer, and appears as a more naturally shaped individual snack chip as compared to the known double pressed chips which have a rather flat and uniform geometry.

BRIEF DESCRIPTION OF THE DRAWINGS

Embodiments of the present invention will now be described by way of example only, with reference to the accompanying drawings, in which:

FIG. 1 shows a flow diagram of the method of manufacturing snack chips according to an embodiment of the present invention.

DETAILED DESCRIPTION

Referring to FIG. 1, the present invention relates to a method of manufacturing a snack chip including a cycle of sequential steps. The method includes an initial step 2 of disposing into a press mould 4 a predetermined amount of a plurality of pellets 6 including at least one potato ingredient.

The pellets 6 include at least 25 wt % of the at least one potato ingredient. The potato ingredient is selected from one or more of a dehydrated potato ingredient, a non-dehydrated potato ingredient or a whole potato ingredient. The dehydrated potato ingredient may be selected from one or more of potato flakes, granules or flour. Typically, the pellets 6 further include at least one further ingredient selected from potato starch and rice flour. In one embodiment, the pellets 6 comprise from 40 to 60 wt % of at least one potato ingredient selected from one or more of a dehydrated potato ingredient, a non-dehydrated potato ingredient or a whole potato ingredient, from 20 to 40 wt % potato starch and from 5 to 15 wt % rice flour, optionally with further ingredients such as seasoning, vegetable oil, flavoring, water, etc.

The pellets 6 are formed by extruding a dough including the at least one potato ingredient at a temperature of not greater than 120° C. The resultant pellets 6 are essentially uncooked, or are incompletely cooked. The pellets 6 are typically substantially spherical. The low temperature pellet-forming process reduces the possibility of acrylamide formation in the pellets 6.

The pellets 6 are dispensed, as a predetermined dose, into the mould 4. The mould 4 has complementary upper and lower major moulding surfaces 8, 10 and an annular peripheral surface 12, these surfaces 8, 10, 12 defining a closed mould cavity 14. The mould 4 includes an upper pressure plate 16, defining the upper moulding surface 8, which is reciprocally movable between an upper open position remote from the remainder of the mould 4 and a downward closed position applying pressure to material within the mould 4 supported on lower pressure plate 18. The mould 4 is configured to mould a disc-like shape, typically circular, although other shapes may be formed in the mould 4. The upper and lower major surfaces 8, 10 may be planar, although these may be contoured if desired.

The pellets 6 are compressed in the closed mould 4 in a first pressing step 20. Typically, the pellets 6 are compressed for a period of from 0.5 to 5 seconds, more typically from 1 to 3 seconds. The first pressing step 20 forms a compressed body 22 in the closed mould 4.

Thereafter, in a baking step 24 the compressed body 22 is baked in the closed mould 4 at an elevated baking temperature to form a baked compressed body 26. The elevated baking temperature is from 180 to 240° C., optionally from 200 to 225° C. The baked compressed body 26

After the baking step 24, in a subsequent expansion step 28 the mould 4 is at least partially opened to allow the baked compressed body 26 to expand in thickness to form an expanded body 30. The baked compressed body 26 is expanded for a period of from 0.1 to 2 seconds, optionally from 0.1 to 1 seconds. The baked compressed body 26 is expanded at an upper surface 32 thereof by spacing the upper pressure plate 16 of the at least partially open mould 4 above the upper surface 32 of the baked compressed body 26.

In a second subsequent pressing step 34, the expanded body 30 at the elevated baking temperature is compressed in the closed mould 4 to form a snack chip 36 having a moisture content of from 4 to 10 weight %, optionally from 6 to 8 weight %, based on the weight of the snack chip 36. The expanded body 30 is pressed for a period of from 1 to 5 seconds, optionally from 1.5 to 4.5 seconds. The second pressing step 34 compresses the expanded body 30 so that the expanded body 30 is reduced in thickness to form the snack chip 36.

After the second pressing step 34, the mould 4 is opened in opening/ejection step 38 and at least a portion of the snack chip 36 expands in initial thickness to form the final snack chip 40.

When the mould 4 is opened, steam within the snack chip 36 is released to cause at least one of blistering and bending of at least one portion of the final snack chip 40.

Prior to the baked snack chip 40 being ejected from the mould 4, the snack chip 40 has a moisture content of from 4 to 10 weight %, optionally from 6 to 8 weight %, based on the weight of the snack chip 40. In other words, when the potato based foodstuff is present in the mould 4 at the elevated temperature required to bake the foodstuff, the moisture content is at least 4 wt %, and preferably at least 6 wt %, based on the weight of the foodstuff.

Then the snack chip 40 is ejected from the mould 4 in the opening/ejection step 40. The ejection may be carried out by a pusher mechanism 42 which also deposits a subsequent dose of pellets 6 into the mould 4.

Finally, the snack chip 40 is dried in a drying step 44 to a final snack chip moisture content of from 0.5 to less than 4 weight %, optionally from 1 to 3 weight %, based on the weight of the snack chip. The drying step is carried out at a temperature of not greater than 121° C., optionally from 105 to 110° C.

In the preferred embodiment, the moulding steps, from product filling to ejection, have a total cycle time of from 7 to 15 seconds, optionally from 10 to 12 seconds. The moulding steps are controlled so that the final snack chip 38 has an acrylamide content of less than 500 ppb by weight.

Various modifications to the present invention will be readily apparent to those skilled in the art and are encompassed within the scope of the present invention.

The invention claimed is:

1. A method of manufacturing a snack chip, the method comprising the steps of:
   i. providing a plurality of pellets including at least one potato ingredient, wherein the plurality of pellets includes at least 25 wt %, based on the weight of the pellet, of at least one potato ingredient and wherein the at least one potato ingredient is selected from one or more of a dehydrated potato ingredient, a non-dehydrated potato ingredient or a whole potato ingredient, the pellets being formed by extruding a dough including the at least one potato ingredient at a temperature of not greater than 120° C.;
   ii. compressing the plurality of pellets in a closed mould in a first pressing step, to form a compressed body;
   iii. baking the compressed body in the closed mould at a baking temperature of from 180 to 240° C. to form a baked compressed body;
   iv. at least partially opening the mould to allow the baked compressed body to expand to form an expanded body;
   v. in a second subsequent pressing step, compressing the expanded body at the baking temperature in the closed mould to form a snack chip having a moisture content of from 4 to 10 weight % based on the weight of the snack chip;
   vi. opening the mould, wherein at least a portion of the snack chip expands in thickness to form a final snack chip and releasing steam within the snack chip to cause at least one of blistering and bending of at least one portion of the snack chip;
   vii. ejecting the snack chip from the mould; and
   viii. drying the snack chip to a final snack chip moisture content of from 0.5 to less than 4 weight % based on the weight of the snack chip, wherein the drying step viii is carried out at a temperature of not greater than 121° C.

2. A method according to claim 1 wherein in step iv the baked compressed body is expanded for a period of from 0.1 to 2 seconds.

3. A method according to claim 2 wherein in step iv the baked compressed body is expanded for a period of from 0.1 to 1 seconds.

4. A method according to claim 1 wherein in step iv the baked compressed body is expanded at an upper surface thereof by spacing an upper part of the at least partially open mould above an upper surface of the compressed body.

5. A method according to claim 1 wherein in step v the expanded body is pressed for a period of from 1 to 5 seconds.

6. A method according to claim 5 wherein in step v the expanded body is pressed for a period of from 1.5 to 4.5 seconds.

7. A method according to claim 1 wherein in step iii the compressed body is baked for a period of from 0.2 to 5 seconds.

8. A method according to claim 7 wherein in step iii the compressed body is baked for a period of from 0.3 to 4 seconds.

9. A method according to any claim 1, wherein the baking temperature is from 200 to 225° C.

10. A method according to claim 1 wherein after the second subsequent pressing step v the snack chip has a moisture content of from 6 to 8 weight % based on the weight of the snack chip.

11. A method according to claim 1, wherein in step viii the final snack chip moisture content is from 1 to 3 weight % based on the weight of the snack chip.

12. A method according to claim 1, wherein in step ii the pellets are compressed for a period of from 0.5 to 5 seconds.

13. A method according to claim 12 wherein in step ii the pellets are compressed for a period of from 1 to 3 seconds.

14. A method according to claim 1, wherein the drying step viii is carried out at a temperature of from 105 to 110° C.

15. A method according to claim 1, wherein steps ii to vii have a total cycle time of from 7 to 15 seconds.

16. A method according to claim 15 wherein steps ii to vii have a total cycle time of from 10 to 12 seconds.

17. A method according to claim 1, wherein the dehydrated potato ingredient is selected from one or more of potato flakes, granules or flour.

18. A method according to claim 1, wherein the pellets further include at least one further ingredient selected from potato starch and rice flour.

19. A method according to claim 18 wherein the pellets comprise from 40 to 60 wt % of at least one potato ingredient selected from one or more of a dehydrated potato ingredient, a non-dehydrated potato ingredient or a whole potato ingredient, from 20 to 40 wt % potato starch and from 5 to 15 wt % rice flour.

* * * * *